US012360330B2

(12) United States Patent
Shikama

(10) Patent No.: US 12,360,330 B2
(45) Date of Patent: Jul. 15, 2025

(54) IMAGING MODULE, CAMERA AND ELECTRONIC DEVICE

(71) Applicant: AAC Optics Solutions Pte. Ltd., Singapore (SG)

(72) Inventor: Kazuo Shikama, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 124 days.

(21) Appl. No.: 18/518,649

(22) Filed: Nov. 24, 2023

(65) Prior Publication Data

US 2025/0013003 A1 Jan. 9, 2025

(30) Foreign Application Priority Data

Jul. 7, 2023 (JP) ................................ 2023-112144

(51) Int. Cl.

| | |
|---|---|
| ***G02B 7/09*** | (2021.01) |
| ***G03B 3/10*** | (2021.01) |
| ***G03B 9/06*** | (2021.01) |
| ***G03B 11/04*** | (2021.01) |
| ***H04N 23/55*** | (2023.01) |
| ***H04N 23/75*** | (2023.01) |

(52) U.S. Cl.

CPC ................ *G02B 7/09* (2013.01); *G03B 3/10* (2013.01); *G03B 9/06* (2013.01); *G03B 11/045* (2013.01); *H04N 23/55* (2023.01); *H04N 23/75* (2023.01)

(58) Field of Classification Search

CPC .......... G02B 7/09; G02B 7/04; G02B 13/001; G03B 3/10; G03B 9/06; G03B 11/045; G03B 11/04; G03B 13/34; G03B 30/00; H04N 23/55; H04N 23/75; H04N 23/00; H04N 23/50; H04N 23/60; H04N 23/70; H04N 23/72

See application file for complete search history.

(56) References Cited

U.S. PATENT DOCUMENTS

| | | | | |
|---|---|---|---|---|
| 2023/0269451 A1* | 8/2023 | Hsu | G02B 7/021 | 348/374 |
| 2023/0273504 A1* | 8/2023 | Chen | G03B 30/00 | 396/510 |
| 2024/0061317 A1* | 2/2024 | You | G03B 3/10 | |
| 2024/0069410 A1* | 2/2024 | Tseng | G03B 9/24 | |
| 2024/0103342 A1* | 3/2024 | Tsai | G03B 9/06 | |

FOREIGN PATENT DOCUMENTS

| | | |
|---|---|---|
| JP | 202121846 * | 2/2021 |

* cited by examiner

*Primary Examiner* — Albert H Cutler

(74) *Attorney, Agent, or Firm* — Wiersch Law Group

(57) ABSTRACT

The present invention relates to an imaging module. A first driving member and a second driving member cooperate to drive the lens support frame to focus; and the first driving member is also for cooperating with a third driving member to drive multiple light-shielding blades to gather or separate, via the blade driving frame and the blade driving ring That is, the drive member which drives the light-shielding blade to move and drives the lens module to focus is the first driving member, so that the number of components of the imaging module can be reduced, thereby reducing the volume and weight of the imaging module, and avoiding interference between the focusing structure. A camera and an electronic device are also provided.

12 Claims, 19 Drawing Sheets

IMAGING MODULE, CAMERA AND ELECTRONIC DEVICE

TECHNICAL FIELD

The present disclosure relates to the field of imaging device, and more particularly, to an imaging module, a camera and an electronic device.

BACKGROUND

An aperture (variable diaphragm) is used to change the amount of light that enters the optical system and participates in imaging. An aperture is provided in an imaging module, which can adjust the size of the aperture to adapt the imaging module to the shooting requirements of different light and dark scenarios. A focusing mechanism can achieve focusing of the imaging module by changing the position of the lens, enabling the imaging module to capture the target object more clearly. The combination of the aperture and the focusing mechanism can improve the shooting performance of the imaging module. Therefore, the imaging module with the aperture and the focusing mechanism is widely used in electronic devices such as smart phones and tablets, and is favored by consumers.

By driving multiple blades to move with a blade driving device, the size of the opening surrounded by these blades can be changed, and this can be applied to different optical units on a camera, such as shutters, apertures, or filters. In an optical system that adjusts by moving the lens with a lens driving device, the blade driving device may interfere with the movement and configuration of the lens driving device due to factors such as size, weight, and multi-directional protrusions in the assembly direction. Although a smaller, lighter blade driving mechanism made of shape memory metal can be used to overcome the problem of large weight and volume, when a large variation in the size of the opening surrounded by the blades is required, the length of the shape memory metal needs to be increased, which still cannot effectively solve various problems caused by the large volume and weight of the blade driving mechanism.

In addition, interference between the blade driving mechanism and the focusing mechanism needs to be avoided, which may affect the servo control of the focusing mechanism. Alternatively, in order to make the blade driving mechanism move appropriately to block light when the lens moves, it is necessary to distribute the weight of the blade driving mechanism uniformly throughout the circumference. Such design solutions are difficult to implement and the reliability of the resulting product cannot be guaranteed.

Therefore, there is an urgent need in the field for an imaging module that can solve the above technical problems.

SUMMARY

The objective of the present disclosure is to provide an imaging module, a camera, and an electronic device, which can reduce the volume and weight of the imaging module and avoid interference between the focusing mechanism and the blade driving mechanism in the imaging module.

To solve the above technical problem, the first aspect of the present invention provides an imaging module, including:

a lens module;

a lens support frame sleeved on the outer edge of the lens module;

a base sleeved on the outside of the lens support frame;

a first driving member disposed on the base;

a second driving member disposed on the lens support frame and opposite to the first driving member, thereby driving the lens support frame to move along the optical axis direction together with the lens module;

a blade driving frame movably supported on the base and sleeved on the outside of the lens module;

a spherical support member sandwiched between the blade driving frame and the base;

a blade support portion disposed at one side of the lens module away from the base;

a blade driving ring, the blade driving ring being disposed on the blade driving frame, the blade driving ring being rotatably engaged with the blade support portion with the optical axis as the rotation axis;

a plurality of light-shielding blades, the plurality of light-shielding blades being located between the blade driving ring and the blade support portion, and the plurality of light-shielding blades being circumferentially disposed on the blade driving ring at interval; each of the plurality of light-shielding blades having one end rotatably connected to the blade support portion, and the other end slidably connected to the blade driving ring; and a third driving member disposed on the blade driving frame and opposite to the first driving member; the third driving member and the first driving member interacting to drive the blade driving frame to rotate relative to the base with the optical axis as the rotation axis, the blade driving frame driving the blade driving ring to rotate thereby driving the plurality of light-shielding blades to gather or separate.

As an improvement, the first driving member is a magnet, the second driving member is a focusing coil, and the third driving member is a blade driving coil; when the focusing coil is energized, the magnet drives the focusing coil to move along the optical axis to, thereby driving the lens support frame to move along the optical axis for focusing; and when the blade driving coil is energized, the magnet drives the blade driving coil to rotate about the optical axis, thereby driving the blade driving frame to rotate about the optical axis.

As an improvement, the side of the base facing the blade driving frame has at least three first accommodation slots that extend in an arc shape, and the side of the blade driving frame facing the base has at least three second accommodation slots that extend in an arc shape; the first accommodation slots and the second accommodation slots are correspondingly formed one-to-one thereby enclosing accommodation spaces; the spherical support members are multiple, each of the accommodation spaces accommodating at least one of the spherical support members, and the spherical support members simultaneously abut against the inner walls of the first accommodation slots and the second accommodation slots.

As an improvement, the imaging module further including a blade retaining member, wherein blade retaining member is fixed to the blade driving frame, and the blade retaining member is configured for cooperating with the first driving member to keep the blade driving frame in the initial position when the power is off.

As an improvement, the blade driving ring is provided with a plurality of through slots, and the plurality of through slots are circumferentially arranged along the blade driving ring at interval; each of the through slots extends from the outer edge to the inner edge of the blade driving ring, and the extending direction of each of the through slots forms an angle with the radial direction of the blade driving ring; each of the plurality of light-shielding blades is an arc-shaped sheet, one end of each of the plurality of light-shielding blades is provided with a guide portion, the guide portion is located on the object side of the light-shielding blade, and the guide portions of the plurality of light-shielding blades are correspondingly and slidably inserted into the through slots.

As an improvement, the blade support portion is provided with a plurality of positioning holes spaced circumferentially, the other end of each of the plurality of light-shielding blades is provided with a positioning portion, the positioning portion is located on the image side of the light-shielding blade, and the positioning portion of each of the plurality of light-shielding blades is correspondingly and rotatably inserted into the positioning hole.

As an improvement, the blade driving ring is provided with a connecting arm, and the blade driving frame is provided with a connecting slot; and the connecting arm is slidably inserted into the connecting slot along the optical axis to enable the blade driving ring and the blade driving frame to be clasped and connected.

As an improvement, the imaging module further includes a housing having an accommodating space, wherein the base, the lens support frame, and the blade driving frame are located in the accommodating space; the housing has a central through hole, and the central through hole is used to expose the blade driving ring, the plurality of light-shielding blades, and the blade support portion.

As an improvement, the housing is made of magnetic material.

As an improvement, the imaging module further includes a shake-proof mechanism and a sensor assembly provided on the shake-proof mechanism, wherein the shake-proof mechanism is located on the image side of the base, and the shake-proof mechanism is for driving the movement of the sensor assembly to achieve shake-proof.

The present disclosure also provides a camera including a camera body, and the imaging module as mentioned above, the imaging module being arranged on the camera body.

The present disclosure further provides an electronic device including a device main body and the imaging module as mentioned above, the imaging module being arranged on the device main body.

Compared with the related technology, in present disclosure, the base is provided with a first driving member, and the lens support frame is provided with a second driving member. The first driving member cooperates with the second driving member to drive the lens support frame to move along the optical axis for focusing. The blade driving frame is movable relative to the base, and the blade driving frame is provided with a third driving member. The first driving member is also used for cooperating with the third driving member to drive the blade driving frame to rotate around the optical axis, and the blade driving frame rotates to drive the blade driving ring to rotate synchronously. The blade driving ring drives the multiple light-shielding blades to gather or separate, thereby adjusting the size of the opening formed by the light-shielding blades. That is to say, the driving member that drives the multiple light-shielding blades to move and the driving member that drives the lens module to focus are both the first driving member. In this way, the number of components in the imaging module can be reduced, thereby reducing the volume and weight of the imaging module, and avoiding interference between the focusing structure in the imaging module and the power mechanism that drives the multiple light-shielding blades.

BRIEF DESCRIPTION OF THE DRAWINGS

One or more embodiments are exemplarily illustrated in the figures corresponding to the embodiments, which do not limit the embodiments. Elements having the same reference numeral labels in the figures are represented as similar elements, unless otherwise specified. The figures in the drawings are not to scale.

SYMBOL DESCRIPTION

Figure 1:
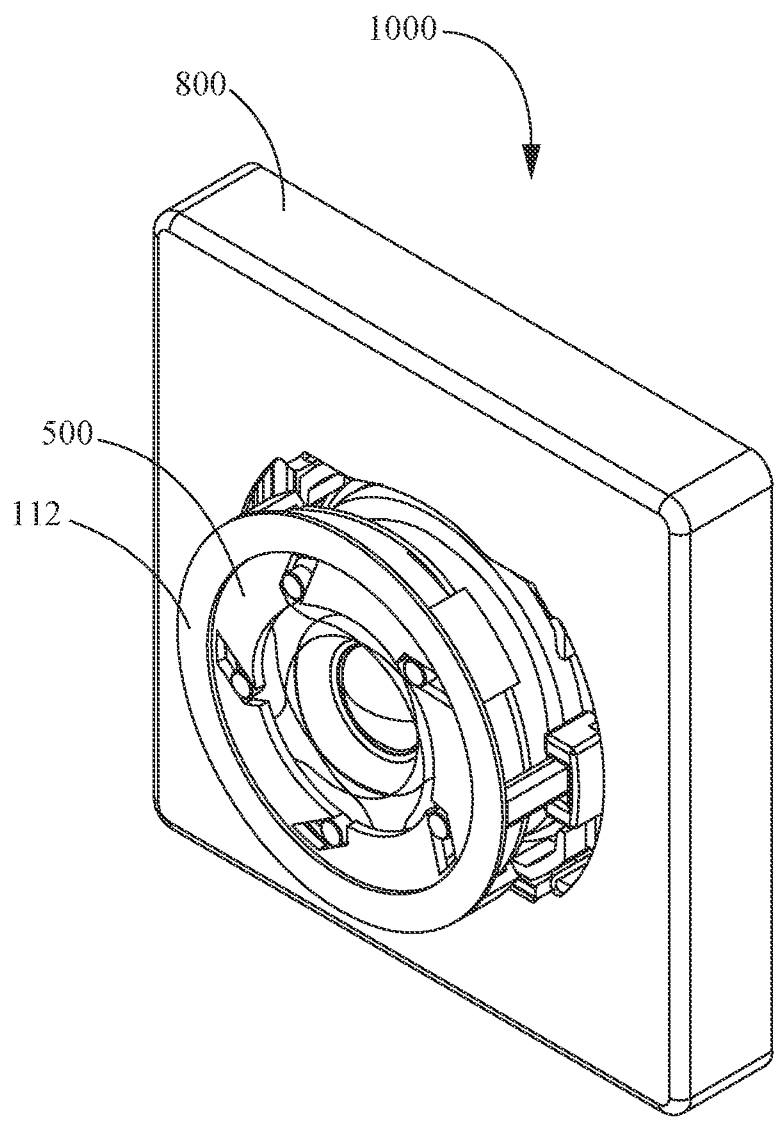
FIG. 1 is a perspective structural view of an imaging module in an embodiment of the present disclosure.
Figure 2:
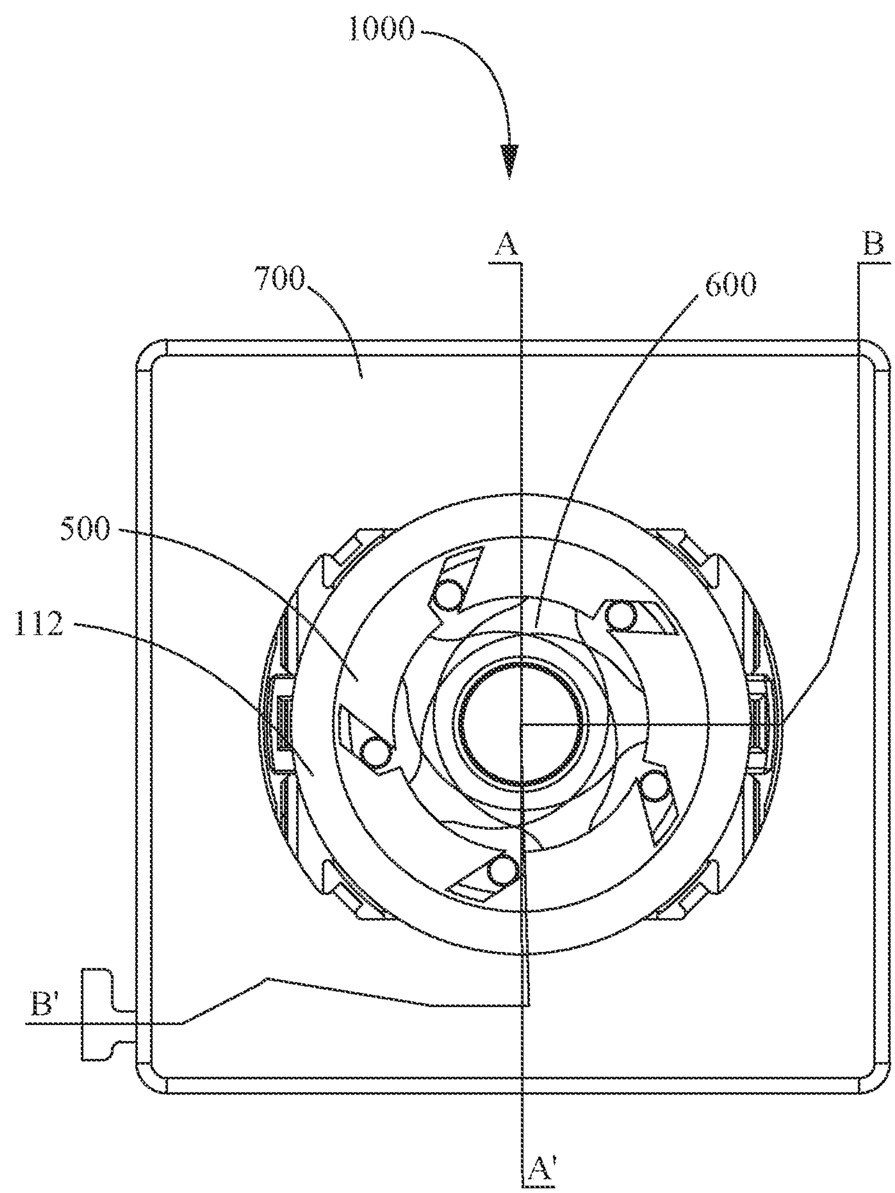
FIG. 2 is a front view of an imaging module in an embodiment of the present disclosure.
Figure 3:
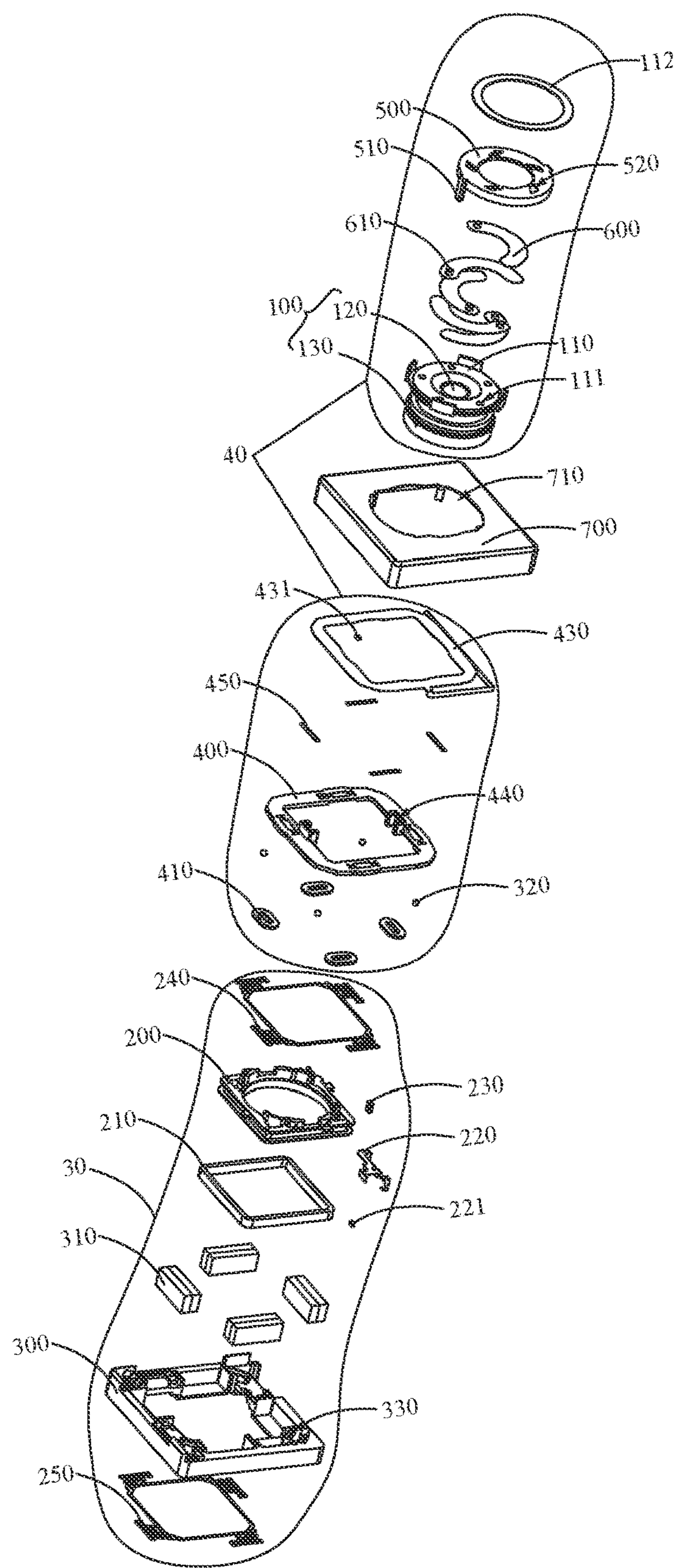
FIG. 3 is an exploded structural view of an imaging module in an embodiment of the present disclosure.
Figure 4:
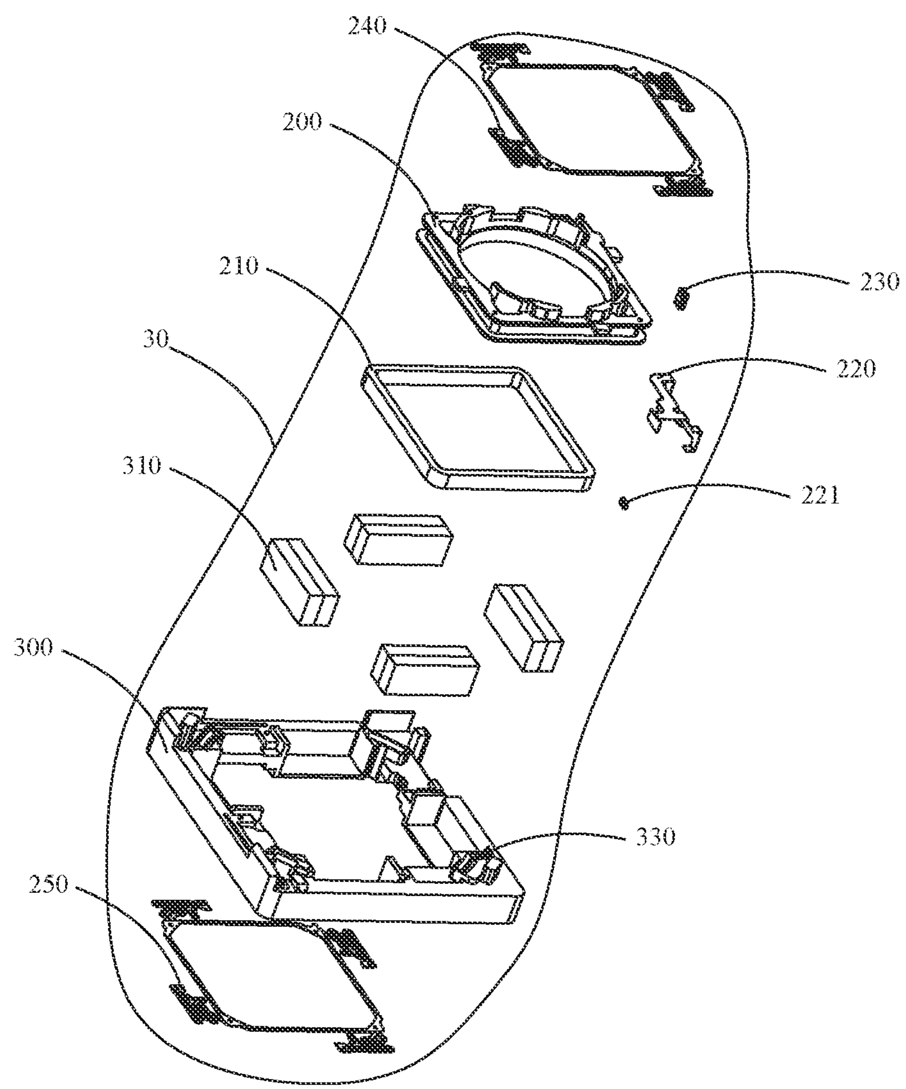
FIG. 4 is an enlarged view of the focusing mechanism in FIG. 3.
Figure 5:
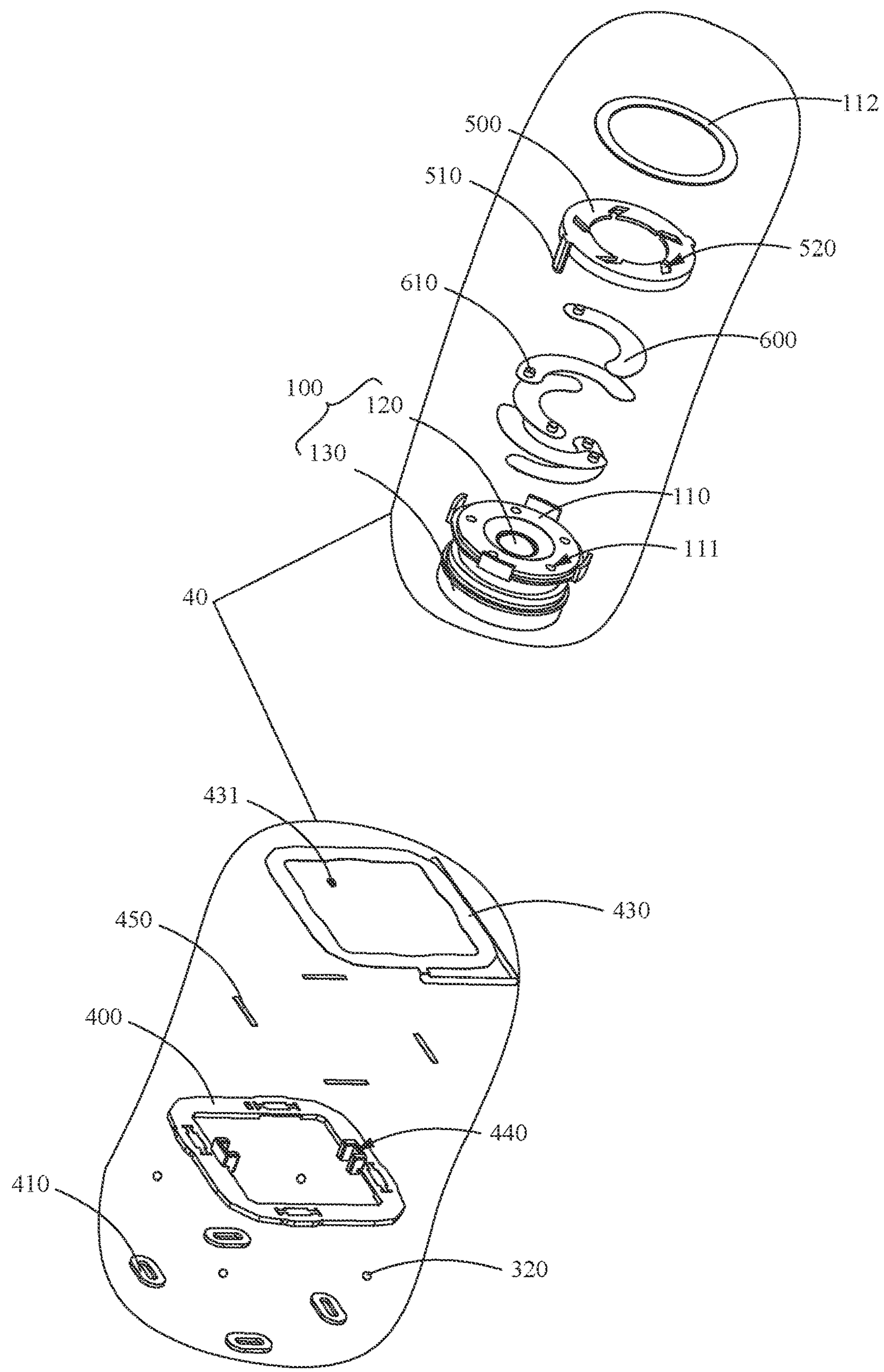
FIG. 5 is an enlarged view of the blade driving mechanism in FIG. 3.
Figure 6:
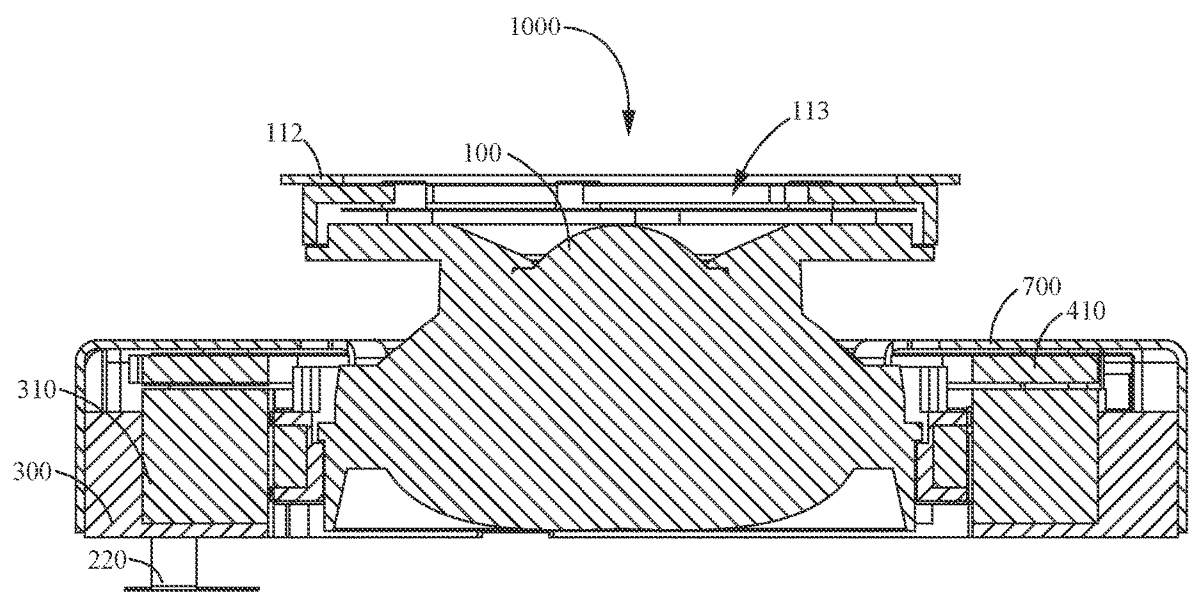
FIG. 6 is a sectional view along the AA' line in FIG. 2.
Figure 7:
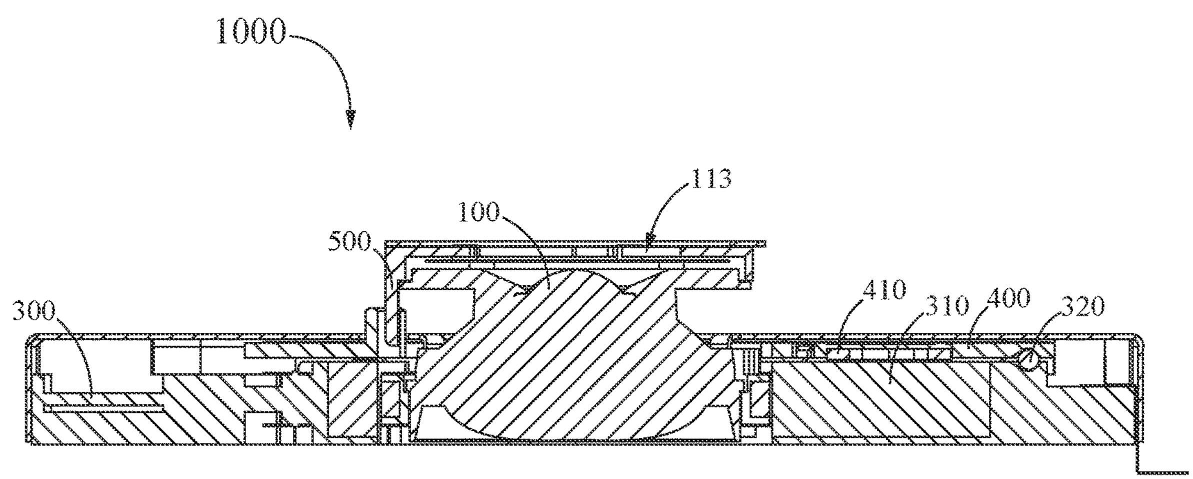
FIG. 7 is a sectional view along the BB' line in FIG. 2.

100 Lens module
110 Blade support portion
111 Positioning hole
112 Drive ring pressing plate
113 Blade chamber
120 Lens
130 Lens barrel
200 Lens support frame

210 Second driving member
220 First flexible circuit board
221 First sensing element
230 First position detection member
240 First leaf spring
250 Second leaf spring
300 Base
310 First driving member
320 Spherical support member
330 First accommodation slot
400 Blade driving frame
410 Third driving member
420 Second accommodation slot
430 Second flexible circuit board
431 Second sensing element
440 Connecting slot
450 Blade retaining member
500 Blade driving ring
510 Connecting arm
520 Through slot
521 Limit portion
600 Light-shielding blade
610 Guide portion
620 Positioning portion
700 Housing
710 First central through hole
720 Bottom shell
30 Focusing mechanism
40 Blade driving mechanism
800 Shake-proof mechanism
810 Sensor assembly
820 Shake-proof base
821 Shake-proof magnet
822 First receiving recess
822*a* First shim
823 Installing hole
823*a* Damping member
830 Movable bracket
831 Fixing yoke
832*a* Second shim
833 Ball
840 Coil bracket
850 Circuit board
1000 Imaging module

DETAILED DESCRIPTION

The following provides a detailed description of the implementation details of the imaging device, camera, and electronic device provided by the present disclosure. The following content is only implementation details provided for ease of understanding, and is not essential for implementing this solution.

An embodiment of the present disclosure relates to an imaging module 1000, as shown in FIGS. 1 to 7, including: a lens module 100; a lens support frame 200 sleeved on the outer edge of the lens module 100; a base 300 sleeved on the outside of the lens support frame 200; a first driving member 310 provided on the base 300; a second driving member 210 provided on the lens support frame 200, and oppositely arranged with the first driving member 310 to drive the lens support frame 200 to move along the optical axis together with the lens module 100; a blade driving frame 400 movably supported on the base 300 and sleeved on the outside of the lens module 100; a spherical support member 320 sandwiched between the blade driving frame 400 and the base 300; a blade support portion 110 provided at one side of the lens module 100 away from the base 300; a blade driving ring 500 provided on the blade driving frame 400, and rotatably coupled to the blade support portion 110 in the optical axis direction; a plurality of light-shielding blades 600 located between the blade driving ring 500 and the blade support portion 110, the plurality of light-shielding blades 600 being arranged along the circumferential direction of the blade driving ring 500, and being spaced apart from each other on the blade driving ring 500, the plurality of light-shielding blades 600 each having one end rotatably connected to the blade support portion 110 and the other end slidably connected to the blade driving ring 500; a third driving member 410 provided on the blade driving frame 400 and oppositely arranged with the first driving member 310; the third driving member 410 and the first driving member 310 interacting to drive the blade driving frame 400 to rotate relative to the base 300 about the optical axis, and the blade driving frame 400 driving the blade driving ring 500 to rotate thereby driving the plurality of light-shielding blades 600 to gather or separate.

Compared with the related technology, the base 300 is provided with the first driving member 310; the lens support frame 200 is provided with the second driving member 210. The first driving member 310 cooperates with the second driving member 210 to drive the lens support frame 200 to move along the optical axis for focusing. The blade driving frame 400 is relatively movable with respect to the base 300, and the blade driving frame 400 is provided with the third driving member 410. The first driving member 310 is further used to cooperate with the third driving member 410 to drive the blade driving frame 400 to rotate about the optical axis. When the blade driving frame 400 rotates, the blade driving ring 500 rotates synchronously, and the blade driving ring 500 drives the multiple light-shielding blades 600 to gather or separate, thereby adjusting the size of the opening formed by the multiple light-shielding blades 600. That is, the driving member for driving the multiple light-shielding blades 600 and the driving member for driving the lens module 100 to focus are both the first driving member 310, so that the number of components in the imaging module 1000 can be reduced, thereby reducing the volume and weight of the imaging module 1000, and avoiding interference between the focusing structure in the imaging module 1000 and the power mechanism for driving the multiple light-shielding blades 600.

More specifically, the base 300, the blade driving frame 400, the blade support portion 110, the multiple light-shielding blades 600, and the blade driving ring 500 are sequentially arranged from an image side to an object side of the imaging module 1000. That is, these components are sequentially arranged along the optical axis, so that the imaging module 1000 can be assembled along the extension direction of the optical axis, reducing the assembly difficulty and avoiding protrusions in multiple directions.

The following provides a detailed description of the implementation details of the imaging module of this embodiment. The following content is only implementation details provided for convenience of understanding, and is not necessary for implementing this solution.

It can be understood that, the lens module 100 includes a lens 120 and a lens barrel 130, the lens 120 is fixed to the inner wall of the lens barrel 130, and the lens barrel 130 is used to protect the lens 120 from damage. Secondly, the lens barrel 130 can also provide a space for connecting with the lens support frame 200, that is, the lens support frame 200 is sleeved and fixed on the outer wall of the lens barrel 130, and the blade support portion 110 is provided on the object side of the lens barrel 130.

Figure 8:
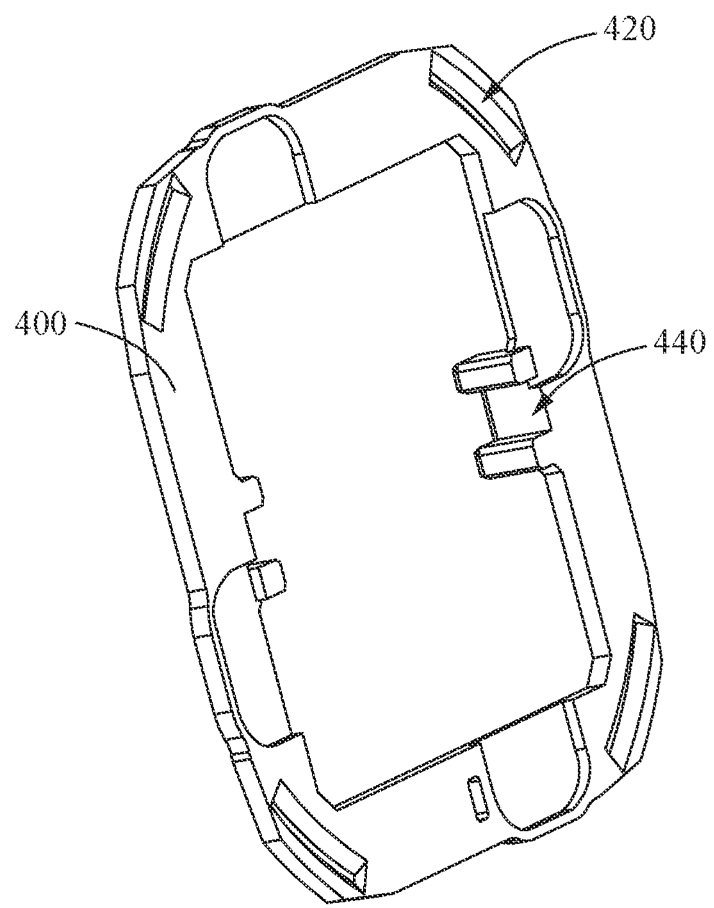
FIG. 8 is a perspective structural view of a blade driving frame of an imaging module in an embodiment of the present disclosure.

Also referring to FIG. 8, in this embodiment, a side of the base 300, which faces the blade driving frame 400, has at least three arc-shaped first accommodation slots 330. And a side of the blade driving frame 400, which faces the base 300, has at least three arc-shaped second accommodation slots 420. The first accommodation slot 330 and the second accommodation slot 420 are correspondingly arranged one-to-one thereby enclosing accommodation spaces; the spherical support members 320 are multiple, each of the accommodation spaces accommodating at least one of the spherical support members 320, and the spherical support members 320 simultaneously abut against the inner walls of the first accommodation slots 330 and the second accommodation slots 420. That is, when the first driving member 310 cooperates with the third driving member 410 to drive the blade driving frame 400 to rotate, the spherical support members 320 can support the blade driving frame 400 and also enable the blade driving frame 400 to rotate smoothly by its own rolling. Optionally, the first accommodation slots 330 and the second accommodation slots 420 can both be provided with four, and the first accommodation slots 330 and the second accommodation slots 420 are correspondingly arranged opposite to each other, and the spherical support member 320 can also be correspondingly provided with four, and each accommodation space accommodates one of the spherical support members 320.

Specifically, the first accommodation slots 330 and the second accommodation slots 420 are both arranged at intervals along the optical axis. The multiple first accommodation slots 330 can be arranged on the same circular track, or on different circular tracks. Preferably, the multiple first accommodation slots 330 are arranged on the same circular track. The multiple second accommodation slots 420 can be arranged on the same circular track, or on different circular tracks. Preferably, the multiple second accommodation slots 420 are arranged on the same circular track.

In other exemplary embodiments, the first accommodation slot 330 and the second accommodation slots 420 can both be provided with three and the spherical support members 320 can also be provided with three, and each accommodation space accommodates one of the spherical support members 320. In this way, it is possible to ensure that the blade driving frame 400 can rotate relatively to the base 300 when subjected to force, while maintaining stability and preventing the blade driving frame 400 from overturning. In addition, the number of spherical support members 320 can be further reduced to further reduce the weight of the imaging module 1000.

It should be noted that, the specific number and position of the first accommodation slot 330, the second accommodation slot 420, and the spherical support member 320 can be set according to the actual force requirements, and the present disclosure does not make particularly limited.

Further, the first driving member 310 is a magnet, the second driving member 210 is a focusing coil, and the third driving member 410 is a blade driving coil. The magnet drives the focusing coil to move along the optical axis when the focusing coil is powered on, so as to drive the lens support frame 200 to move along the optical axis for focusing. The magnet drives the blade driving coil to rotate about the optical axis when the blade driving coil is powered on, so as to drive the blade driving frame 400 to rotate about the optical axis. Specifically, when the focusing coil and the blade driving coil are powered on, a Lorentz force is generated between the focusing coil, the blade driving coil and the magnet, and the focusing coil and the blade driving coil are driven to move by the Lorentz force. Accordingly, the focusing coil and the blade driving coil can be powered on when focusing and blade movement is required, thereby improving the controllability of the imaging module.

In this embodiment, the focusing coil is circumferentially arranged around the outer edge of the lens support frame 200. In this implement, the lens support frame 200 is annular, and the focusing coil is wound around the outer wall of the lens support frame 200. When the focusing coil is energized, a Lorentz force is generated between the focusing coil and the magnet, and since the magnet is fixed on the base 300, the focusing coil drives the lens support frame 200 to move.

More specifically, the magnet is multiple. The multiple magnets are circumferentially arranged on the base 300 at intervals along the optical axis, and are located on the side of the base 300 facing the lens support frame 200.

Alternatively, in other exemplary embodiments, there are multiple focusing coils, and the multiple focusing coils are circumferentially arranged on the lens support frame 200 at intervals. For example, the focusing coils are designated as four, and the four focusing coils are arranged around the outer periphery of the lens support frame 200 and are equally spaced on the lens support frame 200. When the focusing coil is energized, the four focusing coils are all subjected to force, to drive the lens support frame 200 to move. It can be understood that, the number of the focusing coils can also be other numbers, such as two, three or more. Preferably, multiple focusing coils are equally spaced around the optical axis on the lens support frame 200, which can make the force applied on the lens support frame 200 more balanced and improve the stability and reliability of the imaging module 1000.

Further, the blade driving coils are multiple, and the multiple blade driving coils are circumferentially arranged on the blade driving frame 400 at intervals. Similarly, the blade driving coils can be four, and the four blade driving coils are spaced on the blade driving frame 400. When the blade driving coils are energized, Lorentz force is generated between the blade driving coils and the magnet, and the four blade driving coils are subjected to force to drive the blade driving frame 400 to rotate about the optical axis.

It should be noted that the lens support frame 200 moves along the optical axis under the action of Lorentz force, while the blade driving frame 400 rotates about the optical axis under the action of Lorentz force. This is because the direction of Lorentz force acting on the lens support frame 200 and the blade driving frame 400 is different, the reason being that the setting manner of the focusing coils and the blade driving coils are different. Specifically, the direction of Lorentz force can be determined according to the left-hand rule.

Further, a first flexible circuit board 220 is provided on the lens support frame 200, and a second flexible circuit board 430 is provided on the blade driving frame 400, and the first flexible circuit board 220 and the second flexible circuit board 430 are electrically connected. In this way, the first flexible circuit board 220 and the second flexible circuit board 430 can be powered on simultaneously, achieving synchronous adjustment of focusing and aperture size.

Referring again to FIGS. 3 and 4, in this embodiment, it is also necessary to detect the focusing movement amount of the lens support frame 200 and the rotation amount of the blade driving frame 400 to precisely control the focusing and aperture adjustment of the imaging module 1000. Specifically, a first position detection member 230 is provided on the lens support frame 200, and the first flexible circuit board 220 is electrically connected with a first sensing element 221. When the lens support frame 200 moves, the first sensing element 221 detects the relative position change of the first position detection member 230 to determine the focusing movement amount of the lens support frame 200. For example, the first position detection member 230 can be a magnet, and the first sensing element 221 can be a Hall element. When the lens support frame 200 moves along the optical axis, the magnet follows the movement of the lens support frame 200, while the position of the Hall element is relatively fixed, resulting in a constantly changing magnetic field at the position of the Hall element, mainly reflected in the constantly changing magnetic flux passing through the Hall element, thereby allowing detection of the movement amount of the lens support frame 200.

The second flexible circuit board 430 is electrically connected with a second sensing element 431. When the blade driving frame 400 rotates, the second sensing element 431 detects the relative position of the first driving member 310 to determine the rotation angle of the blade driving frame 400. For example, when the first driving member 310 is a magnetic member (i.e., a magnet), the second sensing element 431 can be a Hall element. When the first driving member 310 drives the blade driving frame 400 to rotate and drives the second sensing element 431 to move, the second sensing element 431 detects the change in magnetic flux caused by the first driving member 310 at different positions to determine the rotation angle of the blade driving frame 400.

Further, the lens support frame 200 is also provided with a first leaf spring 240 and a second leaf spring 250. The first leaf spring 240 and the second leaf spring 250 are respectively fixed to the object side surface and the image side surface of the lens support frame 200. At the same time, the first leaf spring 240 and the second leaf spring 250 are also respectively fixed to the object side surface and the image side surface of the base 300, thereby suspending and fixing the lens support frame 200 on the base 300.

In this embodiment, in order to avoid the blade driving ring 500 interfering with the lens 100 during focusing of the lens 100, the blade driving ring 500 needs to be movable along the optical axis. Specifically, the blade driving ring 500 is provided with a connecting arm 510, and the blade driving frame 400 is provided with a connecting slot 440, and the connecting arm 510 is slidably inserted into the connecting slot 440 along the optical axis so that the blade driving ring 500 and the blade driving frame 400 are clasped and connected. Specifically, the connecting slot 440 penetrates through the blade driving frame 400 along the optical axis, but clamps the connecting arm 510 in the direction perpendicular to the optical axis. That is, the connecting slot 440 is a through slot extending along the optical axis. In this way, when the blade driving frame 400 rotates, it can drive the blade driving ring 500 to rotate about the optical axis, while not affecting the movement of the blade driving ring 500 in the direction of the extension of the optical axis. Since the blade driving ring 500 is sleeved on the outer side of the lens 100, when the lens 100 is driven by the lens support frame 200 to move along the optical axis towards the direction away from the base 300, the outer edge of the lens barrel 130 pushes the blade driving ring 500 to move in the same direction, and at this time, the connecting arm 510 slides in the connecting slot 440.

Optionally, the connecting arm 510 and the connecting slot 440 can be designated as multiple. The multiple connecting arms 510 and the multiple connecting slots 440 are clasped and connected correspondingly one by one. Preferably, the connecting arm 510 can be provided with two, which are respectively provided on opposite sides of the blade driving ring 500; and the connecting slot 440 can be provided with two, which are respectively provided on opposite sides of the blade driving frame 400. In this way, the stability between the blade driving frame 400 and the blade driving ring 500 can be improved without increasing the manufacturing difficulty of the imaging module 1000.

Figure 9A:
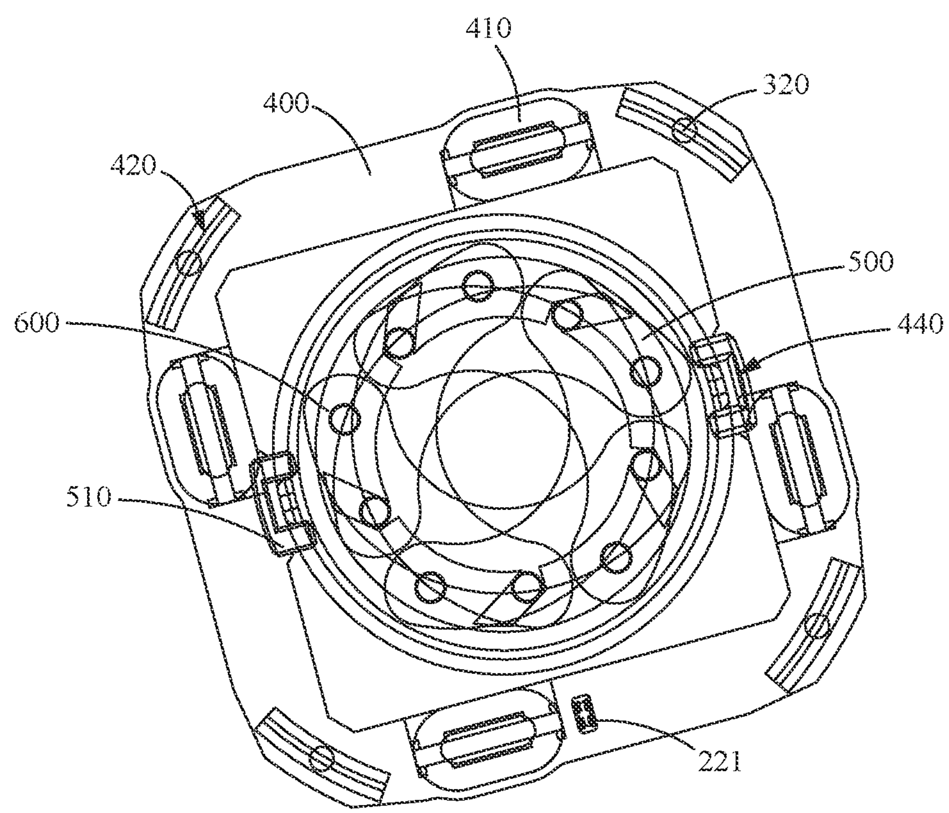
FIG. 9A is a schematic view of multiple light-shielding blades of an imaging module in an embodiment of the present disclosure, in a state of gathering to the limit position.
Figure 9B:
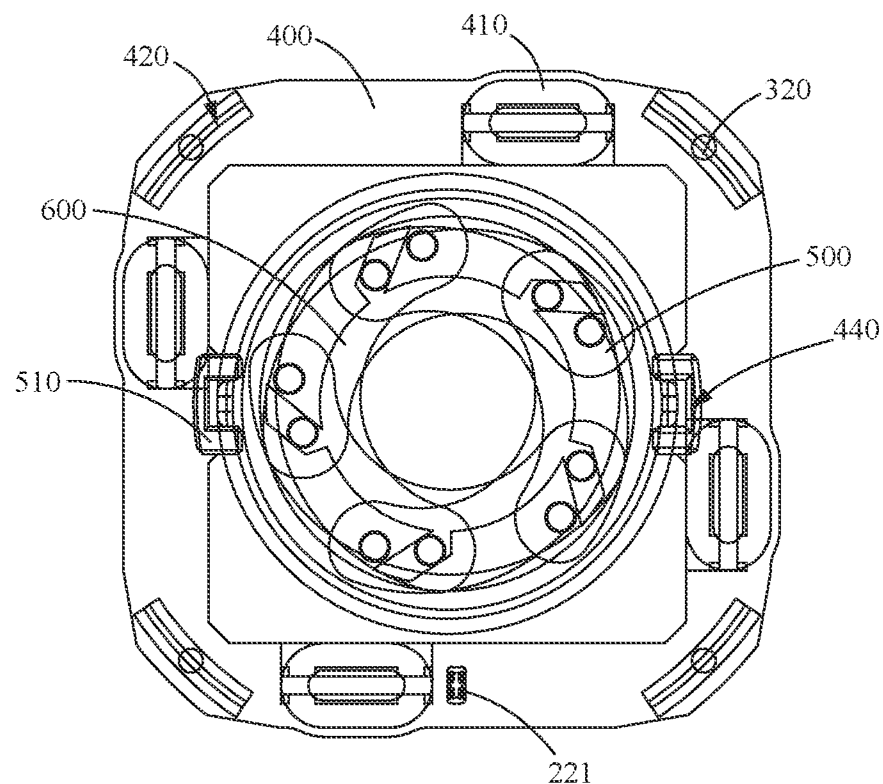
FIG. 9B is a schematic view of multiple light-shielding blades of an imaging module in an embodiment of the present disclosure, in a state of separating.
Figure 9C:
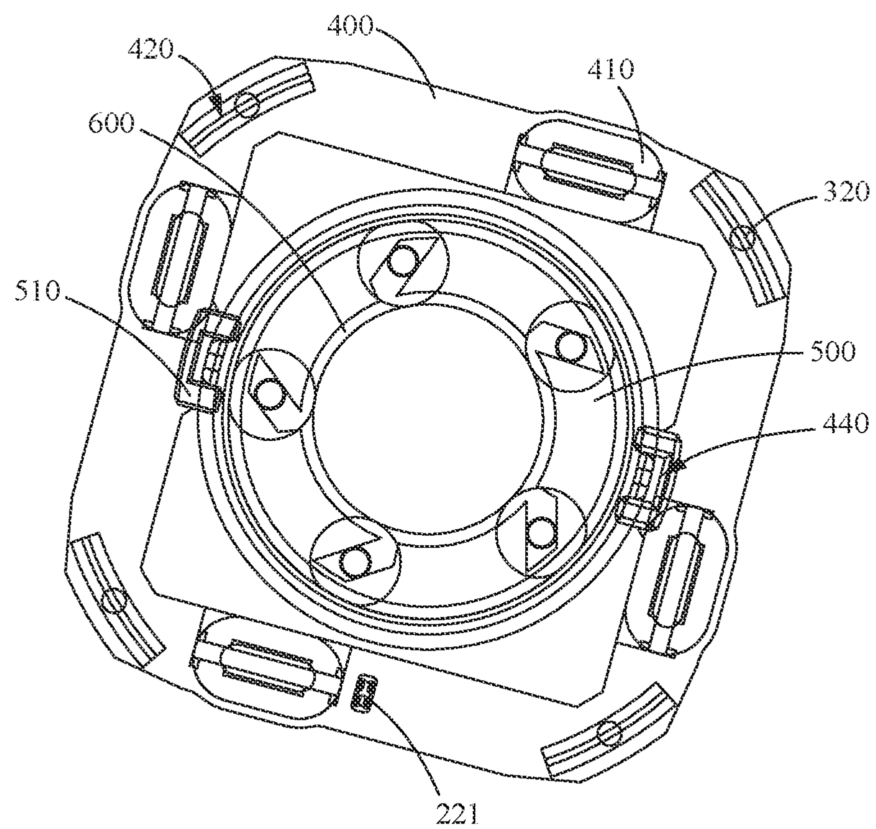
FIG. 9C is a schematic view of multiple light-shielding blades of an imaging module in an embodiment of the present disclosure, in a state of separating to their extreme positions.

Also referring to FIGS. 9A to 9C, driven by the blade driving frame 400, the blade driving ring 500 rotates and drives the multiple light-shielding blades 600 to gather or separate, thereby adjusting the size of the aperture. FIG. 9A is a schematic view of the multiple light-shielding blades 600 of the imaging module 1000, in a state of gathering to the limit position. FIG. 9B is a schematic view of the state of the multiple light-shielding blades 600 of the imaging module 1000, in a state of separating. FIG. 9C is a schematic view of the state of the multiple light-shielding blades 600 of the imaging module 1000, in a state of separating to their extreme positions.

It can be understood that, the blade support part 110, the blade driving ring 500, and the multiple light-shielding blades 600 together constitute an adjustable diaphragm. When the blade driving ring 500 is driven to rotate, the blade driving ring 500 drives the multiple light-shielding blades 600 to move, thereby changing the aperture of the adjustable diaphragm, and accordingly adjusting the amount of light that can pass through the adjustable diaphragm. When current is applied to the blade driving coil, the rotation of the blade driving frame 400 can drive the blade driving ring 500 to rotate, and the blade driving ring 500 drives the multiple light-shielding blades 600 to gather, resulting in the opening formed by the multiple light-shielding blades 600 becoming smaller and reducing the amount of light entering the imaging module 1000; or the blade driving ring 500 drives the multiple light-shielding blades 600 to separate, resulting in the opening formed by the multiple light-shielding blades 600 becoming larger and increasing the amount of light entering the imaging module 1000.

In some cases, the blade driving frame 400 may also rotate due to an undesirable action or vibration, resulting in a change in the amount of light entering the imaging module that does not conform to expectations. To avoid a similar situation, the imaging module of the present embodiment further includes a blade retaining member 450, which is fixed to the blade driving frame 400, and the blade retaining member 450 is configured to cooperate with the first driving member 310 to cause the blade driving frame 400 to remain in the initial position when in the power-off state. Thus, in the case where the blade driving coil is not powered on, even if the blade driving frame 400 rotates due to an unexpected vibration, causing the multiple light-shielding blades 600 to move, the blade retaining member 450 and the first driving member 310 can cooperate to cause the blade driving frame 400 to return to the initial position, thereby stabilizing the positions of the multiple light-shielding blades 600 and maintaining the size and shape of the opening formed by the multiple light-shielding blades 600 relatively stable, thereby keeping the amount of light entering the imaging module 1000 stable.

Specifically, the blade retaining member 450 and the first driving member 310 are both magnetic members, and the first driving member 310 attracts the blade retaining member 450 to maintain the angle of the blade driving frame 400 relative to the base 300. More specifically, the first driving member 310 in this embodiment is a magnet, and the blade retaining member 450 is a yoke. The magnet attracts the yoke by magnetic force, causing the position of the blade driving frame 400 to remain relatively stable relative to the base 300. In the power-off state, when an unexpected action or vibration causes the blade driving frame 400 to rotate, under the action of the attractive force between the magnet and the yoke, the blade driving frame 400 automatically resets, causing the multiple light-shielding blades 600 to remain in a relatively stable position, thereby maintaining the size of the aperture. In addition, due to the action of the magnet and the yoke, the influence of unexpected actions or vibrations on the blade driving frame 400 can also be reduced.

It can be understood that, in this embodiment, the base 300 and the blade driving frame 400 are relatively fixed in the direction along the optical axis by the attractive force between the first driving member 310 and the blade retaining member 450. Specifically, the first driving member 310 attracts the blade retaining member 450, and since the blade retaining member 450 is fixed to the blade driving frame 400, the blade driving frame 400 is driven by the blade retaining member 450 to be relatively fixed to the base 300. As can be seen from the above disclosure, a plurality of the spherical support members 320 are sandwiched between the base 300 and the blade driving frame 400, and the spherical support members 320 can roll relatively to the base 300 and the blade driving frame 400. Since the movement track of the spherical support member 320 is constrained by the first accommodation slot 330 and the second accommodation slot 420, when the blade driving frame 400 is subjected to the Lorentz force between the first driving member 310 and the third driving member 410, the blade driving frame 400 can rotate relatively to the base 300 in a plane perpendicular to the optical axis with the optical axis as the rotation axis.

Optionally, the blade retaining member 450 can be multiple, and circumferentially spaced around the blade driving frame 400. In this way, the attractive force between the magnet and the yoke can be increased, and the stability of the positions of the plurality of light-shielding blades 600 can be improved. Preferably, the length of the blade retaining member 450 is not less than 20% of the length of the first driving member 310, so that the attractive force between each pair of the yoke and the magnet can be increased, and the stability of the positions of the plurality of light-shielding blades 600 can be improved. In addition, the attractive force can also be changed by adjusting the length of the yoke, thereby changing the reset ability of the aperture. More preferably, when the blade retaining member 450 and the first driving member 310 are directly facing each other, the geometric center of the blade retaining member 450 and the geometric center of the first driving member 310 are connected by a line in parallel to the optical axis. The arrangement of the yoke and the magnet in this position can more effectively utilize the magnetic force than other arrangements.

For the first driving member 310 and the blade retaining member 450, the use of the magnetic force between them to fix the position of the blade driving frame 400 has a similar effect to fixing it with a spring. Therefore, the interaction force between the first driving member 310 and the blade retaining member 450 can be adjusted by adjusting the size, shape, position, and manufacturing material of the first driving member 310 and the blade retaining member 450, similar to adjusting the spring constant of a spring, thereby changing the position stability of the blade driving frame 400.

It can be understood that, in this embodiment, in order to reduce the manufacturing and testing difficulty of the imaging module 1000, the magnet employed by the first driving member 310 may be magnet steel of the same specification (such as size, shape, and material, etc.). When the second drive member 210 is designated as multiple, the focusing coils used by the second drive member 210 may also be coils of the same specification; the blade driving coils used by the third driving member 410 may also be coils of the same specification; the yoke used by the blade retaining member 450 may also be yokes of the same specification. In some cases, when different magnets are required for the first driving member 310, the specifications, number, and positions of the different magnets can be adjusted according to the force situation, and the same applies to the second driving member 210, the third driving member 410, and the blade retaining member 450, which will not be described in detail here.

Further, in order to improve the position stability of the first driving member 310, a number of grooves corresponding to the first driving member 310 in shape and outline can be provided on the base 300, and the first driving member 310 can be correspondingly disposed in the grooves one by one, using the inner wall of the grooves to limit and fix the first driving member 310. For the second driving member 210, when the second driving member 210 is a focusing coil surrounding the outer periphery of the lens support frame 200, the lens support frame 200 can be provided with a circumferentially extending groove on the outer edge, and the second driving member 210 can be disposed in the circumferentially extending groove; when the second driving member 210 is a plurality of focusing coils spaced apart, a number of grooves corresponding to the plurality of focusing coils in number and outline can be provided on the lens support frame 200, and the second driving member 210 can be correspondingly disposed in the grooves one by one, using the inner wall of the grooves to limit and fix the second driving member 210. For the third driving member 410, a number of grooves corresponding to the third driving member 410 in number and outline can be provided on the blade driving frame 400, and the third driving member 410 can be correspondingly disposed in the grooves one by one, using the inner wall of the grooves to limit and fix the third driving member 410. The blade retaining member 450 can be provided in the same manner as the third driving member 410. In addition, in general, the size of the blade retaining member 450 is smaller than that of the third driving member 410. Therefore, a groove for installing the blade retaining member 450 can be further formed on the bottom wall of the groove for installing the third driving member 410. In this way, the installation requirements of the third driving member 410 and the blade retaining member 450 can be met, and the blade retaining member 450 can be prevented from detaching from the blade driving frame 400 by using the third driving member 410 to limit it.

In other exemplary embodiments, the magnetic yoke can also be replaced by a magnetic fluid, and the principle is the same as using the magnetic yoke, and will not be repeated here.

Figure 10:
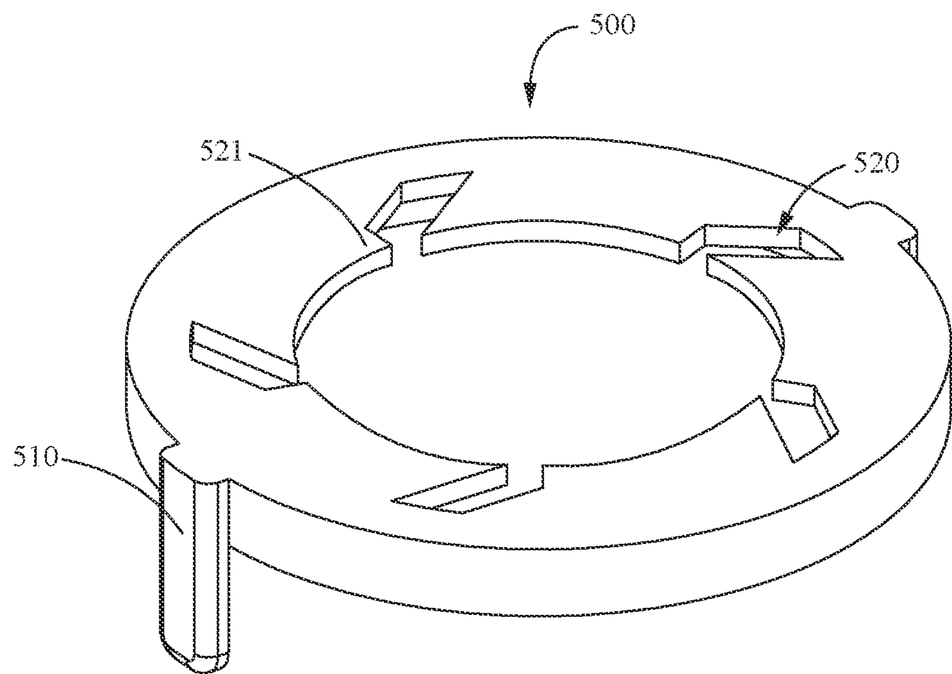
FIG. 10 is a schematic perspective view of the blade driving ring of the imaging module in an embodiment of the present disclosure.
Figure 11:
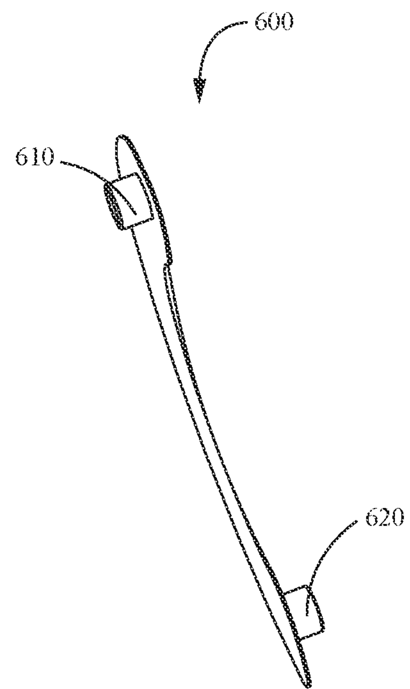
FIG. 11 is a schematic perspective view of the light-shielding blades of the imaging module in an embodiment of the present disclosure.
Figure 12:
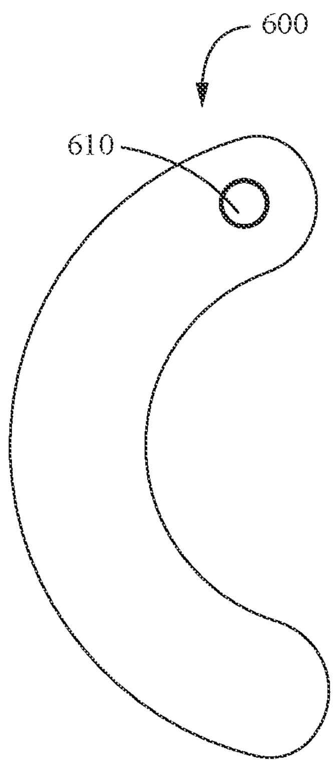
FIG. 12 is a front view of the light-shielding blades of the imaging module in an embodiment of the present disclosure.

Also referring to FIGS. 10 to 12, in this embodiment, the blade driving ring 500 is provided with a plurality of through slots 520, and the plurality of through slots 520 are spaced apart along the circumferential direction of the blade driving ring 500. Each through slot 520 extends from the outer edge to the inner edge of the blade driving ring 500, and the extending direction of each through slot 520 forms an angle with the radial direction of the blade driving ring 500. Each of the plurality of light-shielding blades 600 is an arc-shaped sheet, one end of each of the plurality of light-shielding blades 600 is provided with a guide portion 610, the guide portion 610 is located on the object side of the light-shielding blade 600, and the guide portions 610 of the plurality of light-shielding blades 600 are correspondingly and slidably inserted into the through slots 520 one by one. Thus, when the blade driving ring 500 rotates, the guide portion 610 slides along the inner wall of the through slot 520 under the constraint of the through slot 520, thereby changing the size and shape of the opening formed by the plurality of light-shielding blades 600, and thereby changing the amount of light incident on the imaging module.

Further, the inner walls of the plurality of through slots 520 adjacent to the optical axis are all provided with limit portions 521, and the limit portions 521 are employed to limit the movement range of the guide portion 610. In fact, the limit portion 521 causes the size of the through slot 520 near the optical axis to decrease, and when the guide portion 610 moves to the limit portion 521, it is blocked by the limit portion 521, and the guide portion 610 will not be detached from the through slot 520. Furthermore, the through slot 520 may also be provided with a limit portion 521 at a position far from the optical axis, so that the guide portion 610 can only slide in the through slot 520.

Optionally, the guide portion 610 can be a protrusion protruding from the surface of the light-shielding blade 600. As for the specific shape and size of the protrusion, it can be set according to actual circumstances. Considering the influence of resistance, the guide portion 610 can preferably be a cylindrical structure. When there are other special requirements, the guide portion 610 cane also be appropriately adjusted to other shapes.

Figure 13:
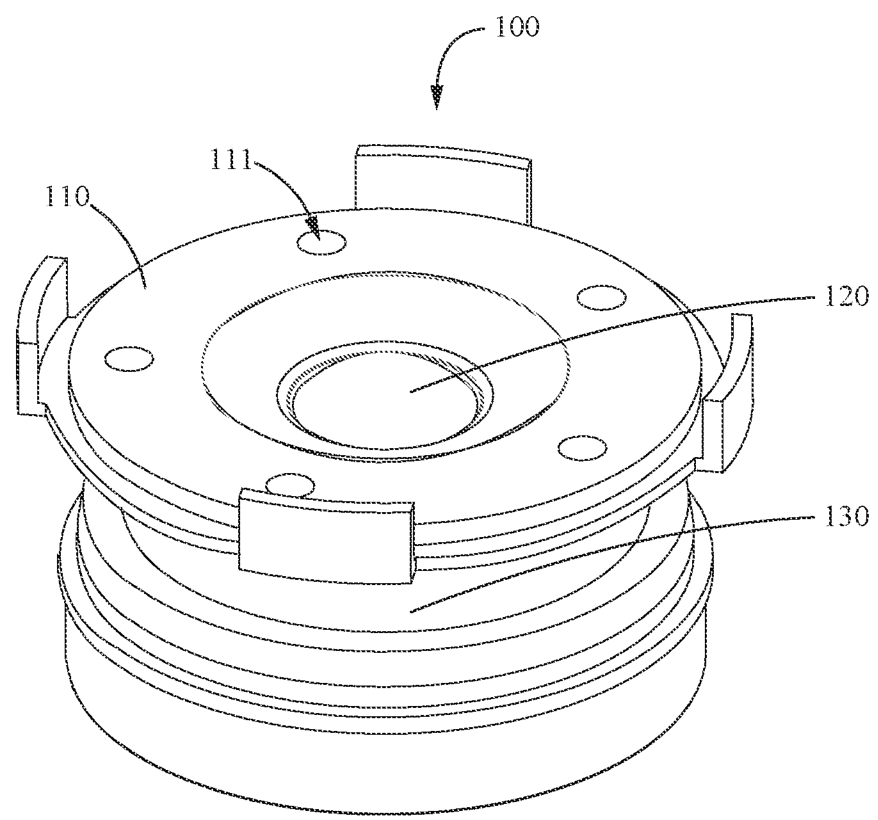
FIG. 13 is a schematic perspective view of the lens module of the imaging module in an embodiment of the present disclosure.
Figure 14:
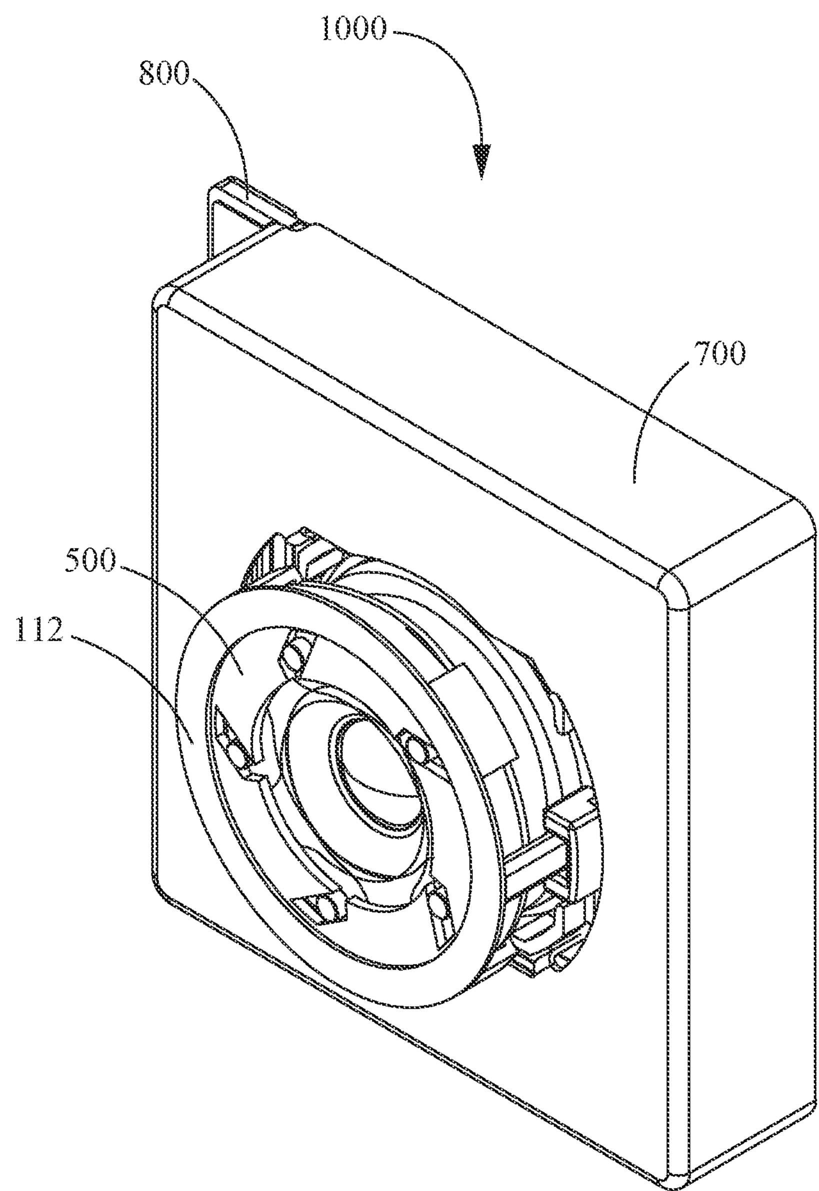
FIG. 14 is a schematic perspective view of the imaging module in another embodiment of the present disclosure.
Figure 15:
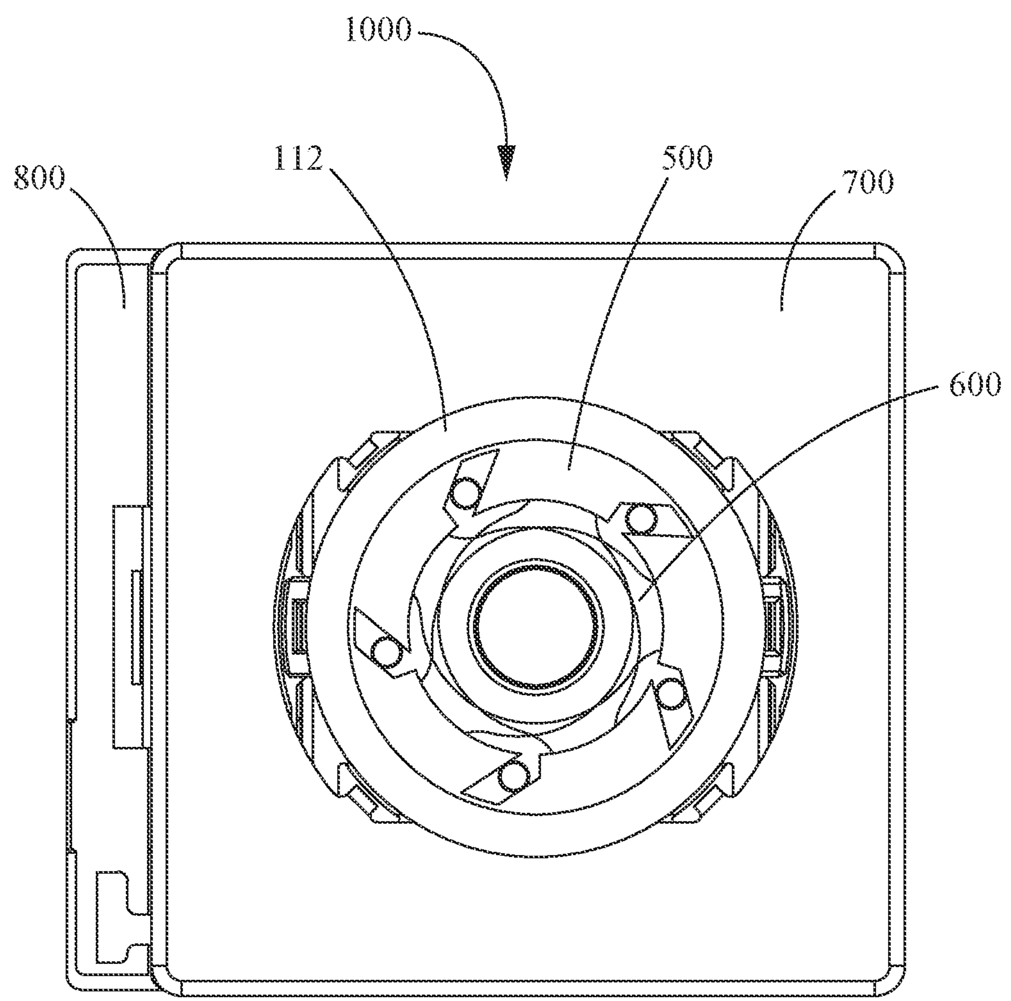
FIG. 15 is a front view of the imaging module in another embodiment of the present disclosure.
Figure 16:
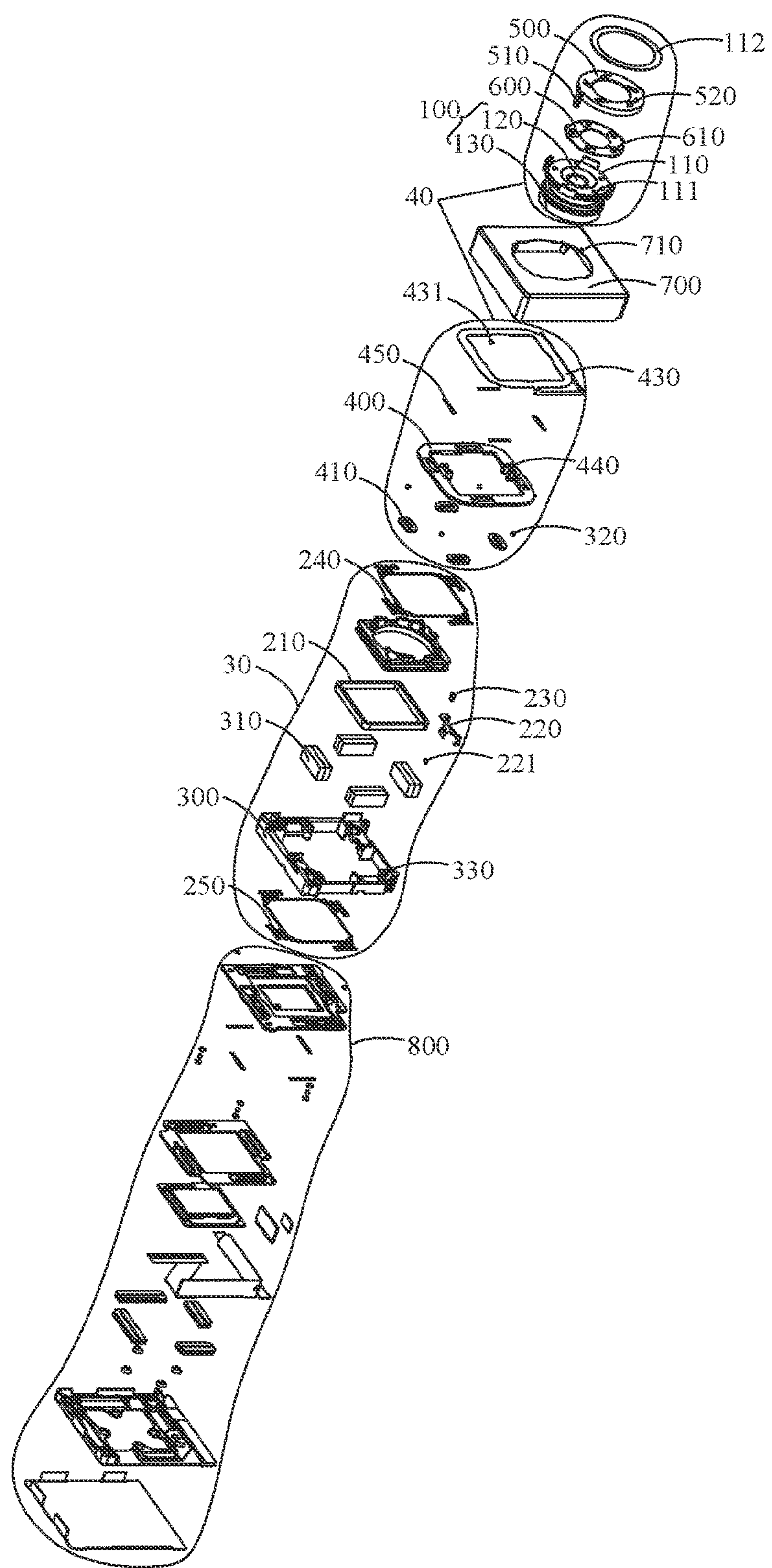
FIG. 16 is an exploded schematic view of the imaging module in another embodiment of the present disclosure.
Figure 17:
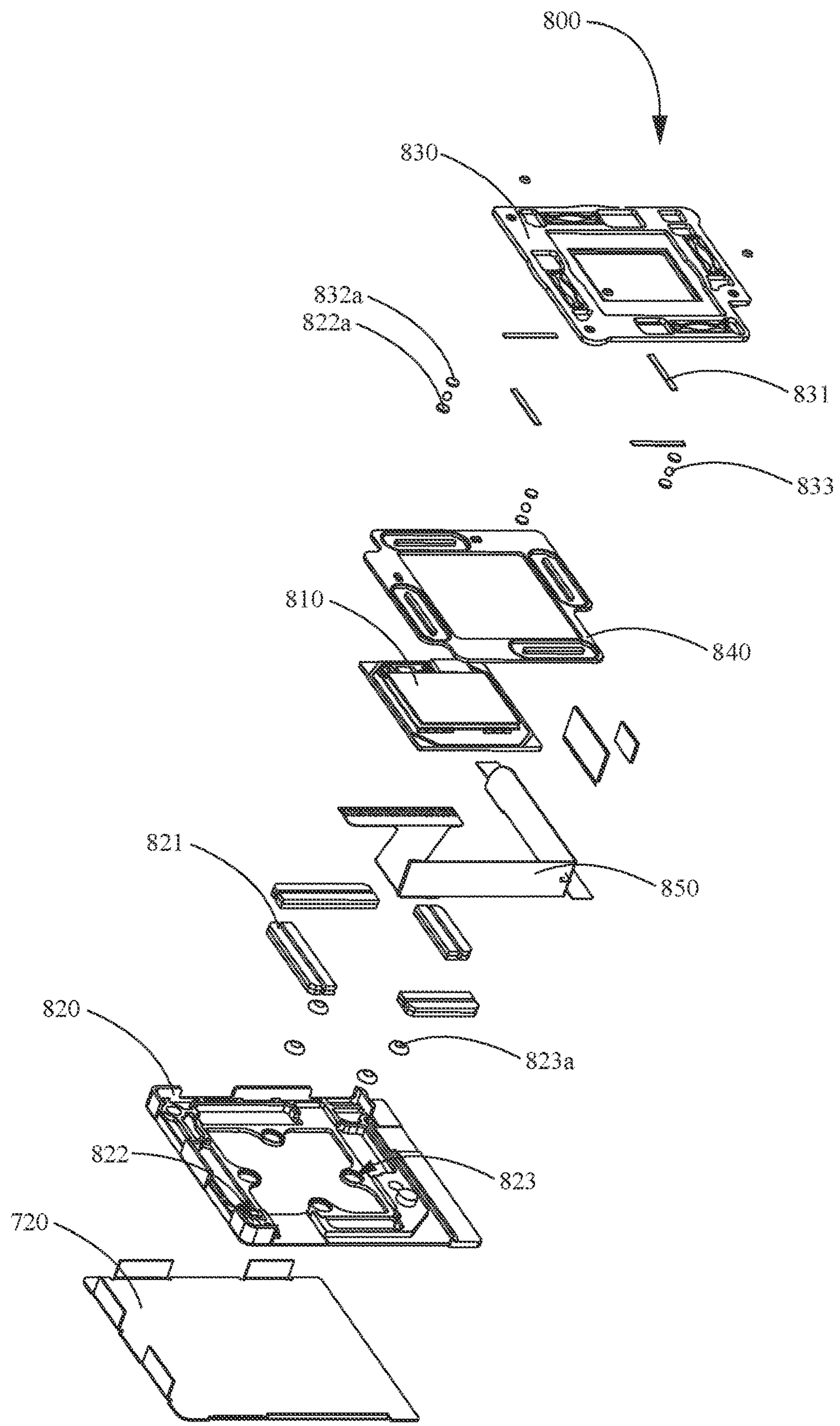
FIG. 17 is an enlarged view of the shake-proof mechanism in FIG. 16.

Referring to FIG. 13 simultaneously, in this embodiment, the blade support portion 110 is provided with a plurality of positioning holes 111 circumferentially spaced apart, and the other end of each of the plurality of light-shielding blades 600 is provided with a positioning portion 620. The positioning portion 620 is located on the imaging side surface of the light-shielding blade 600, and the positioning portions 620 of the plurality of light-shielding blades 600 are correspondingly and rotatably inserted into the positioning holes 111 one by one. That is to say, each of the light-shielding blades 600 is provided with the positioning portion 620 on the image side surface, and the positioning portion 620 is rotatably inserted into the positioning hole 111. When the blade driving ring 500 rotates, the inner wall of the through slot 520 exerts force on the guide portion 610, thereby driving the plurality of light-shielding blades 600 to move. Since the other ends of the plurality of light-shielding blades 600 are constrained by the blade support portion 110 via the positioning portions 620, the plurality of light-shielding blades 600 can still rotate, and therefore, the plurality of light-shielding blades 600 rotate and gather or separate around their respective axes corresponding to the positioning holes 111, thereby achieving the change in the aperture size.

In this embodiment, the blade driving ring 500 is annular, and the plurality of light-shielding blades 600 are all arc-shaped sheet, and the length of the light-shielding blade 600 is 30% to 60% of the circumference of the blade driving ring 500. In this way, the light-shielding blade 600 can have a sufficient length while maintaining a relatively light weight, avoiding mutual interference in the movement processes of different light-shielding blades 600. In this embodiment, the plurality of light-shielding blades 600 are sequentially stacked and surrounded in an annular shape. Specifically, the guide portion 610 of a previous light-shielding blade 600 is inserted into a through slot 520, and the other end of the guide portion 610 is inserted into the positioning hole 111, the object side surface of a next light-shielding blade 600 provided with the guide portion 610 is in close contact with the image side surface of the previous light-shielding blade 600 provided with the positioning portion 620, and the guide portion 610 of the next light-shielding blade 600 is inserted into another through slot 520, and the positioning portion 620 of the next light-shielding blade 600 is inserted into another positioning hole 111. In this way, all the light-shielding blades 600 are surrounded in an annular shape.

Further, an area the frontal projection of the light-shielding blade 600 in a plane perpendicular to the optical axis is designated as a first area. An area of the frontal projection of a sector, with the edge of the light-shielding blade 600 away from the optical axis as an arc, in a plane perpendicular to the optical axis is designated as a second area. The first area is 40% to 70% of the second area. In this way, the weight of the plurality of light-shielding blades 600 can be kept relatively light, and interference between different light-shielding blades 600 can be avoided.

Optionally, the number of the light-shielding blades 600 can be adjusted according to actual needs. Generally, the more the light-shielding blades 600, the closer the opening formed by these light-shielding blades 600 is to a circle. Considering the weight and manufacturing cost of the imaging module, the number of the light-shielding blades 600 can be set to be five to seven.

Referring to FIGS. 6 and 7 again, in this embodiment, the blade support portion 110 is in a grooved shape, and the opening of the grooved shape of the blade support portion 110 faces away from the base 300. A drive ring pressing plate 112 is fixedly provided on the edge of the blade support portion 110 that surrounds the opening. The drive ring pressing plate 112, the blade driving ring 500, and the blade support portion 110 enclose a blade chamber 113. The plurality of light-shielding blades 600 is located in the blade chamber 113. The drive ring pressing plate 112 is used to limit the position of the blade driving ring 500 in the optical axis direction, so as to prevent the blade driving ring 500 and the lens 100 from interfering with each other and hinder the rotation of the blade driving ring 500.

Referring to FIGS. 3 to 5 again, in this embodiment, the focusing mechanism 30 of the imaging module 1000 can include the first driving member 310, the second driving member 210, and the lens support frame 200. The blade driving mechanism 40 of the imaging module 1000 can include the first driving member 310, the third driving member 410, the blade driving frame 400, the blade driving ring 500, and the blade support portion 110. Among them, the driving source of the focusing mechanism 30 and the blade driving mechanism 40 is the first driving member 310.

In this embodiment, the imaging module 1000 further includes a housing 700 having an accommodating space. The base 300, the lens support frame 200, and the blade driving frame 400 are located in the accommodating space. The housing 700 has a first central through hole 710, and the first central through hole 710 is used to expose the blade driving ring 500, the plurality of light-shielding blades 600, and the blade support portion 110. The housing 700 is made of magnetic material, thereby enclosing the focusing coil, the blade driving coil, and the magnet in a closed magnetic circuit to increase the overall magnetism.

Another embodiment of the present disclosure relates to an imaging module 1000. As shown in FIGS. 14 to 17, the imaging module 1000 of this embodiment is substantially the same as that of the previous embodiment, and the main difference is that the imaging module 1000 of this embodiment further includes a shake-proof mechanism 800 and a sensor assembly 810 provided on the shake-proof mechanism 800, the shake-proof mechanism 800 is located on the image side of the base 300, and the shake-proof mechanism 800 is used to drive the sensor assembly 810 to achieve shake-proof.

Compared with the previous embodiment, in addition to achieving focusing in the optical axis direction and adjusting the aperture by using the plurality of light-shielding blades 600, this embodiment can also utilize the shake-proof mechanism 800 to correct the jitter of the sensor assembly 810 in the direction perpendicular to the optical axis, which can further improve the shooting effect of the imaging module 1000. In addition, since the drive of the shake-proof mechanism 800 to the sensor assembly 810 and the drive of the first driving member 310 to the lens 100 are independent of each other, the change in the drive of the first driving member 310 in focusing and aperture adjustment has no impact on the drive of the shake-proof mechanism 800 in shake-proof. In other words, the drive of the shake-proof mechanism 800 for correcting the jitter of the sensor assembly 810 has no impact on the drive of the first driving member 310. Thus, in the performance evaluation of the imaging module 1000, the performance of the focusing mechanism 30, the blade driving mechanism 40, and the shake-proof mechanism 800 can be independently tested, which can reduce the testing difficulty of the imaging module. The imaging module of the present disclosure improves reliability due to the simplification of the structure, and realizes improvement in component configuration, thereby reducing failure rate.

Referring to FIG. 17 again, specifically, the imaging module 1000 further includes a bottom shell 720. The bottom shell 720 and the housing 700 cooperate to enclose and fix the lens 100, the focusing mechanism 30, the blade driving mechanism 40, and the shake-proof mechanism 800. Preferably, the bottom shell 720 can also be made of magnetic material.

In this embodiment, the shake-proof mechanism 800 includes a shake-proof base 820 and a movable bracket 830. The movable bracket 830 is located on the object side of the shake-proof base 820 and is movable relative to the shake-proof base 820 in a direction perpendicular to the optical axis. The sensor assembly 810 is fixed to the movable bracket 830. Thus, the movement of the movable bracket 830 drives the movement of the sensor assembly 810, thereby realizing the shake-proof function of the imaging module 1000.

Specifically, the shake-proof base 820 is provided with a plurality of shake-proof magnets 821 spaced apart around the optical axis, and the movable bracket 830 is provided with a plurality of fixing yokes 831 spaced apart around the optical axis. At least three balls 833 are interposed between the shake-proof base 820 and the movable bracket 830, and the shake-proof magnets 821 and the fixing yokes 831 attract each other to cause the shake-proof base 820 and the movable bracket 830 to approach each other, thereby clamping all the balls 833. Since the balls 833 are spherical, when the balls 833 roll, the movable bracket 830 is movable relative to the shake-proof base 820.

More specifically, the shake-proof base 820 is provided with a plurality of first receiving recesses 822, the movable bracket 830 is provided with a plurality of second receiving recesses (not shown in the figure), and the plurality of balls 833 and the plurality of first receiving recesses 822 are one-to-one corresponding and located in the first receiving recesses 822, and the plurality of second receiving recesses and the plurality of first receiving recesses 822 are one-to-one corresponding. By using the receiving recesses to receive the balls 833, the movement range of the balls 833 can be limited, the balls 833 can be prevented from falling off, and the stability of the imaging module 1000 can be improved.

In this embodiment, each of the first receiving recesses 822 is provided with a first shim **822*a*, and each of the second receiving recesses is provided with a second shim 832*a*. The first shim 822*a* and the second shim 832*a* are both used to support the balls 833**.

In this embodiment, the shake-proof mechanism 800 includes a coil bracket 840 fixed to the movable bracket 830, and the coil bracket 840 is provided with a plurality of shake-proof coils (not shown in the figure) spaced apart around the optical axis. The plurality of shake-proof coils and the plurality of shake-proof magnets 821 are one-to-one corresponding and oppositely arranged. When the shake-proof coil is energized, a Lorentz force is generated between the shake-proof coil and the shake-proof magnet 821, thereby causing the coil bracket 840 to move in a direction perpendicular to the optical axis, and then driving the movable bracket 830 to synchronously movement. When the movable bracket 830 moves, the sensor assembly 810 follows the movement of the movable bracket 830, thereby realizing the shake-proof of the imaging module 1000.

That is to say, the shake-proof base 820 and the movable bracket 830 are relatively fixed in the direction extending along the optical axis by the attractive force between the shake-proof magnet 821 and the fixing yoke 831, and the balls 833 can roll in the first receiving recess 822 and the second receiving recess, that is, the balls 833 can roll relatively to the shake-proof base 820 and the movable bracket 830. When the movable bracket 830 is subjected to the Lorentz force between the shake-proof magnet 821 and the shake-proof coil, the movable bracket 830 can move relatively to the shake-proof base 820 in a plane perpendicular to the optical axis, thereby causing the sensor assembly 810 to move in a plane perpendicular to the optical axis, thereby achieving anti-shake.

Specifically, in this embodiment, the imaging module 1000 supplies power to the plurality of shake-proof coils through the circuit board 850.

In this embodiment, the shake-proof base 820 is provided with an installing hole 823, and the installing hole 823 is provided with a damping member **823*a*, and the damping member 823*a* penetrates through the installing hole 823 and contacts the bottom shell 720 and the sensor assembly 810 respectively. More specifically, the bottom shell 720 and the sensor assembly 810 sandwich the damping member 823*a* so that the damping member 823*a* is slightly deformed. Thus, the damping member 823*a* can provide resistance when the sensor assembly 810 moves, so that the moving speed of the sensor assembly 810 is slowed down, thereby avoiding unnecessary vibration caused by the rapid movement of the sensor assembly 810** during the anti-shake process.

For example, in this embodiment, the number of the installing hole 823 and the damping member **823*a* is four, and they are both arranged at intervals around the optical axis. The damping member 823*a* is made of rubber. It can be understood that the number of the installing hole 823 and the damping member 823***a* can be set to other numbers, and the damping member 823*a* can also be made of silicone gel or other materials with certain elasticity and capable of providing frictional resistance.

Another embodiment of the present disclosure provides a camera, which includes a camera body and an imaging module as described in either of the two embodiments above, and the imaging module is arranged on the camera body.

Another embodiment of the present disclosure provides an electronic device, which includes a device main body and an imaging module as described in either of the two embodiments above, and the imaging module is arranged on the device body.

It can be understood that the electronic device in this embodiment can be a portable terminal such as a smart phone, a tablet computer, a notebook computer, or a smart watch.

The imaging module, camera, and electronic device provided by the embodiment of the present disclosure have been described in detail above. Specific examples are applied to explain the principles and implementation methods of the present invention. The description of the above implementation methods is only used to help understand the idea of the present disclosure. There will be changes in the specific implementation methods and application scope. In conclusion, the content of this specification should not be understood as limitations to the present invention.

What is claimed is:

1. An imaging module, comprising:

a lens module;

a lens support frame sleeved on the outer edge of the lens module;

a base sleeved on the outside of the lens support frame;

a first driving member disposed on the base;

a second driving member disposed on the lens support frame and opposite to the first driving member, thereby driving the lens support frame to move along the optical axis direction together with the lens module;

a blade driving frame movably supported on the base and sleeved on the outside of the lens module;

a spherical support member sandwiched between the blade driving frame and the base;

a blade support portion disposed at one side of the lens module away from the base;

a blade driving ring, the blade driving ring being disposed on the blade driving frame, the blade driving ring being rotatably engaged with the blade support portion with the optical axis as the rotation axis;

a plurality of light-shielding blades, the plurality of light-shielding blades being located between the blade driving ring and the blade support portion, and the plurality of light-shielding blades being circumferentially disposed on the blade driving ring at interval; each of the plurality of light-shielding blades having one end rotatably connected to the blade support portion, and the other end slidably connected to the blade driving ring; and a third driving member disposed on the blade driving frame and opposite to the first driving member; the third driving member and the first driving member interacting to drive the blade driving frame to rotate relative to the base with the optical axis as the rotation axis, the blade driving frame driving the blade driving ring to rotate thereby driving the plurality of light-shielding blades to gather or separate.

2. The imaging module according to claim 1, wherein the first driving member is a magnet, the second driving member is a focusing coil, and the third driving member is a blade driving coil;

when the focusing coil is energized, the magnet drives the focusing coil to move along the optical axis, thereby driving the lens support frame to move along the optical axis for focusing; and when the blade driving coil is energized, the magnet drives the blade driving coil to rotate about the optical axis, thereby driving the blade driving frame to rotate about the optical axis.

3. The imaging module according to claim 1, wherein a side of the base facing the blade driving frame has at least three first accommodation slots that extend in an arc shape, and a side of the blade driving frame facing the base has at least three second accommodation slots that extend in an arc shape; the first accommodation slots and the second accommodation slots are correspondingly arranged one-to-one thereby enclosing accommodation spaces; the spherical support members are multiple, each of the accommodation spaces accommodating at least one of the spherical support members, and the spherical support members simultaneously abut against the inner walls of the first accommodation slots and the second accommodation slots.

4. The imaging module according to claim 1, further comprising a blade retaining member, wherein blade retaining member is fixed to the blade driving frame, and the blade retaining member is configured for cooperating with the first driving member to keep the blade driving frame in the initial position when the power is off.

5. The imaging module according to claim 1, wherein the blade driving ring is provided with a plurality of through slots, and the plurality of through slots are circumferentially arranged along the blade driving ring at interval; each of the through slots extends from the outer edge to the inner edge of the blade driving ring, and the extending direction of each of the through slots forms an angle with the radial direction of the blade driving ring; each of the plurality of light-shielding blades is an arc-shaped sheet, one end of each of the plurality of light-shielding blades is provided with a guide portion, the guide portion is located on the object side of the light-shielding blade, and the guide portions of the plurality of light-shielding blades are correspondingly and slidably inserted into the through slots.

6. The imaging module according to claim 5, wherein the blade support portion is provided with a plurality of positioning holes spaced circumferentially, the other end of each of the plurality of light-shielding blades is provided with a positioning portion, the positioning portion is located on the image side of the light-shielding blade, and the positioning portion of each of the plurality of light-shielding blades is correspondingly and rotatably inserted into the positioning hole.

7. The imaging module according to claim 1, wherein the blade driving ring is provided with a connecting arm, and the blade driving frame is provided with a connecting slot; and the connecting arm is slidably inserted into the connecting slot along the optical axis to enable the blade driving ring and the blade driving frame to be clasped and connected.

8. The imaging module according to claim 1, further comprising a housing having an accommodating space, wherein the base, the lens support frame, and the blade driving frame are located in the accommodating space; the housing has a central through hole, and the central through hole is used to expose the blade driving ring, the plurality of light-shielding blades, and the blade support portion.

9. The imaging module according to claim 8, wherein the housing is made of magnetic material.

10. The imaging module according to claim 1, further comprising a shake-proof mechanism and a sensor assembly provided on the shake-proof mechanism, wherein the shake-proof mechanism is located on the image side of the base, and the shake-proof mechanism is for driving the movement of the sensor assembly to achieve shake-proof.

11. A camera, comprising a camera body and the imaging module as claimed in claim 1, the imaging module being arranged on the camera body.

12. An electronic device, comprising a device main body and the imaging module as claimed in claim 1, the imaging module being arranged on the device main body.

* * * * *